United States Patent
Iketani et al.

[11] 3,917,898
[45] Nov. 4, 1975

[54] WATER-COOLED CABLE

[75] Inventors: Seijiro Iketani; Hiromi Fukuda, both of Kawasaki; Iwao Shirai, Gifu, all of Japan

[73] Assignee: Showa Densen Denran Kabushiki Kaisha, Kawasaki, Japan

[22] Filed: Dec. 11, 1974

[21] Appl. No.: 531,507

Related U.S. Application Data

[63] Continuation-in-part of Ser. No. 430,842, Jan. 4, 1974, which is a continuation of Ser. No. 300,085, Oct. 24, 1972.

[30] Foreign Application Priority Data

Oct. 22, 1971  Japan................... 46-98370[U]

[52] U.S. Cl............. 174/15 C; 138/126; 138/137; 174/110 AR
[51] Int. Cl.². ........................................... H01B 7/34
[58] Field of Search ............. 174/15 C, 68 C, 70 C, 110 AR, 174/130; 138/118, 121, 122, 123, 124, 125, 126, 129, 130, 132, 137

[56] References Cited
UNITED STATES PATENTS

| | | | |
|---|---|---|---|
| 2,613,993 | 10/1952 | Holden | 138/118 X |
| 2,701,818 | 2/1955 | Tims | 174/28 |
| 3,043,612 | 7/1962 | Pavlik et al. | 138/121 X |
| 3,060,973 | 10/1962 | Mlinar | 138/126 |
| 3,186,438 | 6/1965 | Holmgren | 138/121 |
| 3,212,528 | 10/1965 | Haas | 138/129 X |
| 3,500,867 | 3/1970 | Elson | 138/125 |
| 3,599,677 | 8/1971 | O'Brien | 138/121 X |
| 3,616,123 | 10/1971 | Reynolds, Jr. et al. | 138/129 X |
| 3,682,202 | 8/1972 | Buhrman et al. | 138/126 |
| 3,688,016 | 8/1972 | Spade | 174/28 X |

*Primary Examiner*—Arthur T. Grimley
*Attorney, Agent, or Firm*—Sughrue, Rothwell, Mion, Zinn & Macpeak

[57] ABSTRACT

A water-cooled cable having high flexibility and improved twisting and collapsing resistance comprising a stranded conductor and a water-tight hose shielding said stranded conductor in which said watertight hose is composed of an outer shell having a groove or grooves on the peripheral surface, a reinforcing layer adjacent to the outer shell having corrugations corresponding to the groove or grooves on the periphery of the outer shell, and a strong inner member of a flexible material having a relatively large Young's modulus.

11 Claims, 8 Drawing Figures

WATER-COOLED CABLE

CROSS REFERENCE TO RELATED APPLICATIONS

This application is a continuation-in-part of application Ser. No. 430,842, filed Jan. 4, 1974. That application in turn was a continuation of application Ser. No. 300,085, filed Oct. 24, 1972.

BACKGROUND OF THE INVENTION

1. Field of the Invention

This invention pertains to water-cooled cables in general and, in particular, to water-cooled cables used as the feeding wire for steelmaking electric arc furnaces.

2. Prior Art

The conventional water-cooled cable for use with electric furnaces, such as the cable described in U.S. Pat. No. 2,701,818, is produced by covering a flexible, twisted conductor with a water-tight rubber hose having smooth outer and inner peripheral surfaces and an inner diameter slightly larger than the outer diameter of the conductor, thereby forming a water passageway between the conductor and the hose.

Recently developed high power and large-scale electric furnaces, especially steel-making electric arc furnaces, require water-cooled feeding cable having conductors of larger cross-sectional area than were to be found in water-cooled cables previously in use. For example, the cross-sectional area of the conductors of modern feeding cable has now reached to between 2000 mm$^2$ and 4500 mm$^2$ (generally, the cable size is designated by the cross-sectional area of the conductor), whereas that of conventional cable is at most 1000 mm$^2$.

The large-sized water-cooled cable used in this application should have the following properties:

1. The cable must be as flexible as possible. This is because flexibility permits the length of the cable to be reduced, thereby minimizing the reactance of the water-cooled cable itself, increasing the power efficiency, and thereby reducing the power required to drive the electrode actuating apparatus.

2. The hose must be resistant to collapsing and twisting so as not to clog the cooling water passage. This is particularly a problem because, as the cable size, the cross-sectional area of the conductor, and the diameter of the shielding hose increase, the twisting force applied to the cable by the tilting and turning of the furnace is also increased.

3. The cable must be durable.

In conventional electric furnaces, water-cooled cable is attached and hung in a U-form between a power source (such as the secondary winding of a transformer) and a furnace body. The conductor of the cable is made by stranding copper or aluminum wire elements and can be bent with any radius larger than three times the conductor diameter by selecting suitably the diameter and number of the wire element. However, the shielding hose used conventionally for water-cooled cables used in electric furnaces (having generally a wall thickness of between 8 and 12 mm and composed of an outer and inner rubber layer and an intermediate reinforcing sailcloth layer) can not be bent with a radius smaller than six times the conductor diameter, for it was learned experimentally that "buckling" occurred if the cable was bent into a smaller radius. In such a case, a reduction of about 20% in the compression resistance of the hose due to the disturbance of the reinforcing layer was theoretically confirmed. When the conventional hose having the smooth inner and outer peripheral surfaces was bent with the radius smaller than six times the conductor diameter, about 20% of the stretching force was applied to the bending zone of the outer rubber layer, thus reducing severely the durability of the hose under such stress. Furthermore, once the adhesion, or binding, between the rubber layer and the reinforcing layer was destroyed by application of such severe stress, the rigidity of the bent zone was much reduced even if the hose was subsequently straightened and the crease was removed.

Additionally, cable having conventional hose sheaths were not sufficiently resistant to the twisting and collapsing forces caused by the turning and tilting of the furnace body, thus narrowing the passage of the cooling water.

Accordingly, the bending radius of the water-cooled cable was determined in accordance with the tolerable bending radius of the shielding hose, and the bending radius of the conventional hose was generally between 8 and 10 times the inner diameter of the hose, and the twisting angle of the hose was less than 15°/m.

SUMMARY OF THE INVENTION

This invention pertains to water-cooled cables in general and, in particular, to water-cooled cables used in electric arc furnaces. It is the object of this invention to provide a water-cooled cable having high flexibility, improved twisting and collapsing resistance, high durability, and a slidable peripheral surface which prevents the mutual entangling of pluralities of cables. This and other objects are accomplished by providing the cable with a water-tight hose shielding composed of an outer shell having a groove or grooves on the peripheral surface, a reinforcing layer adjacent to the outer shell having corrugations corresponding to the groove or grooves in the periphery of the outer shell, a strong inner member of a flexible material having a relatively large Young's modulus, and a soft inner member composed of a flexible material, the soft inner member being located in gaps between the strong inner member and the corrugations in the reinforcing layer.

DETAILED DESCRIPTION OF THE PREFERRED EMBODIMENT

Figure 1:
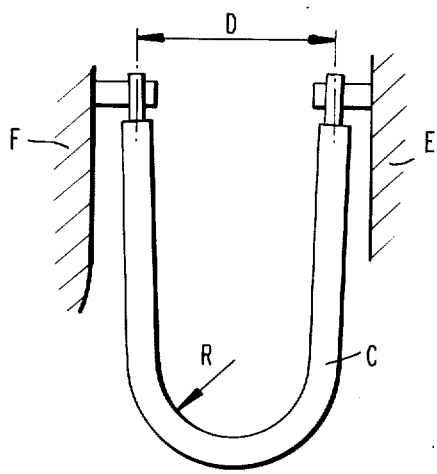
FIG. 1 is a schematic view of a water-cooled cable applied between a power source and an electric furnace.

FIG. 1 depicts a water-cooled cable C attached between a power source E and a furnace body F in the conventional manner. It will be noted that the cable hangs in a U-shaped arc, as is customary in the electric furnace art, and that the ends of the cable C are separated by a distance D which is, to a considerable extent, a function of the radius R to which the cable C is bent. This is an environment in which the present invention finds particular use.

Figure 4:
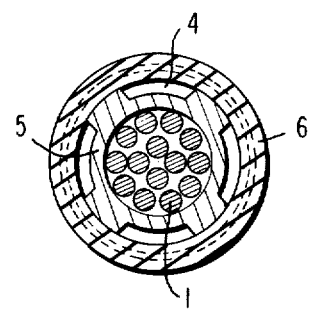
FIG. 4 is a lateral cross-section of the cable taken along the lines IV–IV' in FIG. 2.
Figure 2:
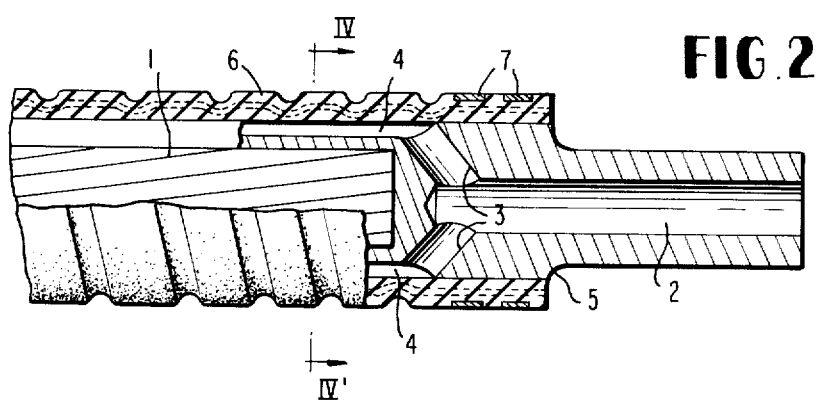
FIG. 2 is a longitudinal partial cross-section of a water-cooled cable according to this invention.
Figure 3:
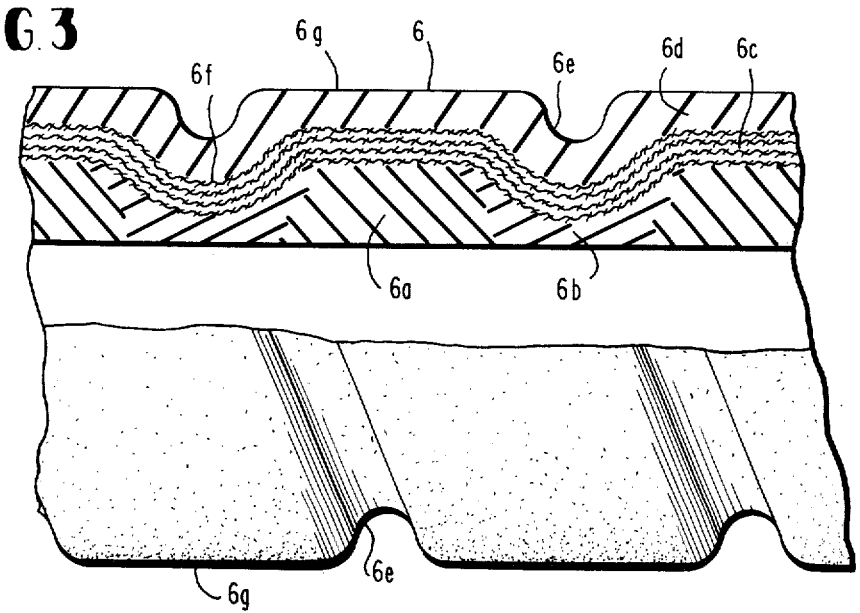
FIG. 3 is an enlarged view, partially in section, of a portion of the water-cooled hose of FIG. 2.

A specific embodiment of this invention is depicted in FIGS. 2–4 and will now be described.

Referring to FIG. 2, a cable terminal 5 having cooling water passages 2, 3 and an axial groove 4 for feeding the cooling water is connected to one end of a stranded flexible conductor 1 by compression, and one end of a hose 6 is fixed to the terminal 5 by a band 7.

The specific structure of the hose 6 is shown in FIG. 3, wherein the hose 6 is composed of a strong inner member 6a of a rubber tape wound with a constant pitch and having a high Young's modulus (e.g., a tape of rubber made by blending natural rubber with styrene butadiene rubber, which has a Young's modulus of between $0.25 \times 10^2 \text{kg/cm}^2$ and $0.40 \times 10^2 \text{kg/cm}^2$, a soft inner member 6b of a usual rubber made by, for example, blending dielectric and water-resistant natural rubber with styrene-butadiene rubber, which has a Young's modulus of between $0.18 \times 10^2 \text{kg/cm}^2$ and $0.30 \times 10^2 \text{kg/cm}^2$, a reinforcing layer 6c of cloth, such as sailcloth or strong rayon, covering both the strong inner member 6a and the soft inner member 6b, and an outer layer 6d of a usual rubber, such as wear and heat-resistant chloroprene, which has a Young's modulus of between $0.18 \times 10^2 \text{kg/cm}^2$ and $0.30 \times 10^2 \text{kg/cm}^2$, covering said reinforcing layer 6c.

A spiral groove 6e is provided on the peripheral surface of the outer layer 6d which winds around the latter with a substantially constant pitch, and a spiral corrugation 6f corresponding to said spiral groove 6e is also formed on the reinforcing layer 6c. The outer surface 6g of the outer layer 6d is flat except for the grooved zones 6e, and the pitch of the spiral groove, i.e., the length of the flat zone 6g between two neighboring grooved zones 6e, is larger than the width of the grooved zone 6e. The strong inner member 6a and the reinforcing layer 6c contact each other at the corrugations in the latter, and the inner member 6b is located in gaps between the strong inner layer 6a and the corrugations in the reinforcing layer 6c.

Figure 6:
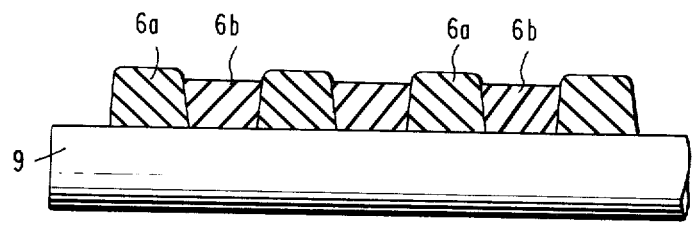
FIGS. 6–8 illustrate a method of making a hose for use in a water-cooled cable according to this invention.
Figure 7:
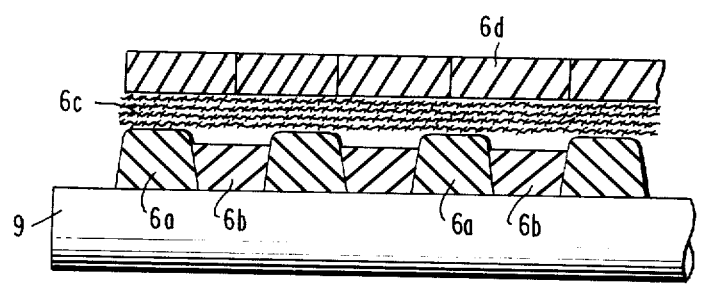
Figure 8:
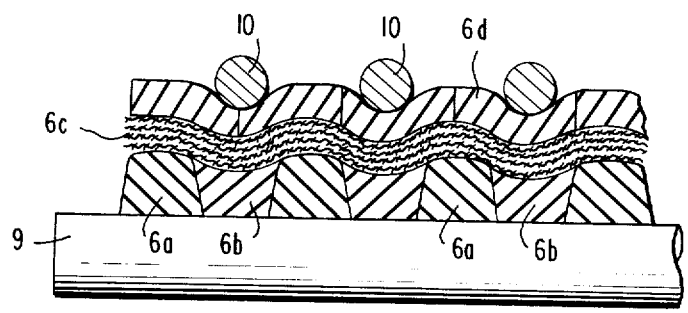

The above described hose may be manufactured in the following manner, as illustrated in FIGS. 6–8. First, an unvulcanized soft rubber tape, which will eventually constitute the soft inner member 6b, is wound around a hose core 9 at a pitch sufficiently large to leave space between successive windings. Second, an unvulcanized hard rubber tape, which will eventually constitute the strong inner member 6a, is wound around the hose core 9 between the windings of the unvulcanized rubber tape. The size of the two tapes and the pitch at which they are wound is chosen to produce the structure shown in FIG. 6, in which the wound tapes continuously abut each other in spirally interleaved fashion. Third, an adhesive reinforcing cloth gummed on both sides, which will eventually constitute the reinforcing layer 6c, is wound around the two inner rubber tapes at a pitch which provides a continuous layer of approximately constant thickness. A bias tape may be used for this layer. Fourth, an unvulcanized soft rubber tape, which will eventually constitute the outer layer 6d, is wound around the reinforcing cloth at a pitch which provides a continuous layer of approximately constant thickness. (Alternatively, a previously extruded rubber tube may be used for the outer layer 6d instead of a rubber tape.) Fifth, a wire rope 10 is wound around the material which is to constitute the outer layer 6d. The wire rope 10 is wound in a path corresponding to the path of the inner member 6d, and it is wound tightly enough to cause the spiral groove 6e in the outer layer 6d and the spiral corrugation 6f in the reinforcing layer 6c. Of course, the wire rope 10 also deforms the soft inner member 6b to some extent and, to a still lesser extent, the strong inner member 6a. The diameter of the wire rope 10 is just large enough to cause the strong inner layer 6a to contact the edges of the corrugations 6f in the reinforcing layer 6c. Sixth, the assembly is vulcanized with the wire rope 10 still in place, causing the strong inner member 6a and the soft inner member 6b to stick together to form a single composite inner member and causing the inner and outer rubber members to stick to the reinforcing layer 6c. Seventh, the wire rope 10 is unwound from the exterior assembly, and the hose core 9 is removed from its interior. Subsequently, the hose so produced may be used to produce a cable according to this invention by inserting into it the flexible conductor 1, providing it with terminals 5 at both ends, and securing the connection between the hose and the terminals 5 by means of the bands 7.

The cable thus formed is flexible due to the existence of the groove, and accordingly the cable can be bent with a smaller radius than it could absent the groove. Furthermore, the outer layer 6d is scarcely deformed by the tensile or compressive forces caused by bending it, due to the existence of the groove.

Additionally, as the corrugation 6f corresponding to the groove 6e is formed on the reinforcing layer 6c, the axial tensile force is scarcely applied thereto when the hose is bent. Therefore, the disturbance or irregular shifting of the reinforcing layer 6c and the decrease of the compression resistance of the hose are almost fully prevented. Furthermore, because the cross-sectional secondary moment on the lateral cross-section of the hose is large, the resistance to the twisting of the hose is increased. As the strong inner member 6a is made from an elastic and flexible material having a Young's modulus larger than that of the materials of the inner member 6b and the outer layer 6d, the twisting resistance is greatly increased, thereby preventing the collapse of the hose.

Moreover, in this invention the inner part of the hose is composed of a strong inner member 6a and a soft inner member 6b provided alternatingly along the longitudinal direction, and the grooves 6e in the outer layer 6d and the corrugations 6f in the reinforcing layer are in register with the soft inner member 6b rather than the strong inner member 6a. From this construction, the present invention has a remarkable effect in flexibility and twisting anti-deformability in comparison with prior art cables in which the inner member is made of a uniform material.

Finally, as the peripheral surface of the hose, except for the grooved zones, is flat, the friction between cables is much reduced.

Various data on the cable of this invention and the conventional cable are listed below, with reference to the configuration shown in FIG. 1.

|  | Cable of this invention | Conventional Cable |
| --- | --- | --- |
| cable length | 8 m | 10 m |
| bending radius (R) | 550 mm | 1100 mm |
| distance between both terminals (D) | 1200 mm | 2600 mm |
| twisting angle of the | about 180° | about 70° |

|  | Cable of this invention | Conventional Cable |
| --- | --- | --- |
| cable by the turning of the furnace |  |  |
| twisting angle of the cable by the tilting of the furnace | about 180° | about 60° |

It will be apparent from the table that as the bending radius of the cable of this invention is about ⅓ of that of the conventional cable, the length of the cable is about 20% smaller than that of the conventional cable, and the distance between both terminals of this cable is about 50% smaller that that of the conventional cable.

As the result of a hose twisting test, the twisting resistance of the hose of this invention is 40°/m – 50°/m, whereas that of the conventional hose is only 15°/m. This means that the hose of this invention is not easily collapsed and twisted, and accordingly, the fear of clogging the water passage of the water-cooled cable is almost fully eliminated.

Figure 5:
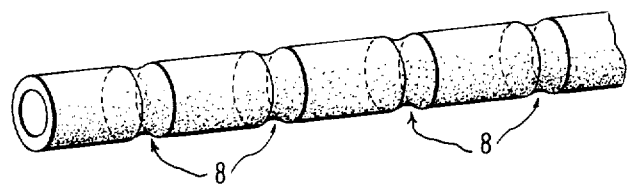
FIG. 5 is a side view of an alternative embodiment of the present invention.

It will be understood that the embodiments of this invention are not restricted to the example described hereinbefore. For example, the spiral groove 6e on the outer layer 6d may be substituted by pluralities of circular grooves, as shown in FIG. 5. Also, the hose is not necessarily made from rubber but may be made from other elastic and flexible materials, such as plastics. If necessary, the outer layer 6d may have a two-component structure similar to that of 6a and 6b in the preferred embodiment. In this configuration the ordinary rubber part will be near the groove and the special rubber part having the high Young's modulus will be internal thereof.

These examples will illustrate that, while the invention has been particularly shown and described with reference to the preferred embodiment thereof, various changes in form and details may be made therein without departing from the spirit and scope of the invention.

What is claimed is:

1. A water-cooled cable having a cross-sectional area of more than 1000 square milimeters, said cable comprising:
   1. a stranded conductor and
   2. a water-tight hose shielding said stranded conductor and forming a water passage between said stranded conductor and said hose, said hose comprising, from outside to inside:
      a. an outer shell composed on a wear-and heat-resistant material having a Young's modulus of between $0.18 \times 100$ kg/cm$^2$ and $0.30 \times 100$ kg/cm$^2$ and having a groove or grooves on its peripheral surface;
      b. a reinforcing layer having corrugations therein corresponding to the groove or grooves on the periphery of said outer shell;
      c. a soft inner member composed of a flexible material having a Young's modulus between $0.18 \times 100$kg/cm$^2$ and $0.30 \times 100$ kg/cm$^2$; and
      d. a strong inner member composed of a flexible material having a Young's modulus between $0.25 \times 100$kg/cm$^2$ and $0.40 \times 100$ kg/cm$^2$,
   said soft inner member being located in gaps between said strong inner layer and the corrugations in said reinforcing layer and said strong inner layer contacting said reinforcing layer at the corrugations.

2. A water-cooled cable as claimed in claim 1 wherein said strong inner member is composed of rubber tape wound with a constant pitch.

3. A water-cooled cable as claimed in claim 1 wherein said soft inner member is composed of rubber tape wound with a constant pitch.

4. A water-cooled cable as claimed in claim 1 which has been vulcanized, causing said strong inner member and said soft inner member to adhere to each other strongly.

5. A water-cooled cable as claimed in claim 1 wherein said groove is spiral and winds around said peripheral surface with a substantially constant pitch.

6. A water-cooled cable as claimed in claim 1 wherein a plurality of circular grooves are formed on the peripheral surface of said hose about the circumference thereof and said grooves are spaced approximately equidistant one from another.

7. A water-cooled cable as claimed in claim 1 wherein said outer shell is composed of chloroprene.

8. A water-cooled cable as claimed in claim 1 wherein said reinforcing layer is composed of sail cloth.

9. A water-cooled cable as claimed in claim 1 wherein said reinforcing layer is composed of strong rayon.

10. A water-cooled cable as claimed in claim 1 wherein said soft inner member is formed by blending natural rubber with styrene butadiene rubber.

11. A water-cooled cable as claimed in claim 1 wherein said strong inner member is formed by blending natural rubber with styrene butadiene rubber.

* * * * *